United States Patent [19]

Zamzow et al.

[11] Patent Number: 4,898,745

[45] Date of Patent: Feb. 6, 1990

[54] METHOD FOR MANUFACTURING OF PASTA FILATA CHEESE WITH EXTENDED SHELF LIFE

[75] Inventors: William H. Zamzow, Glenview; Anthony M. Miller, Northbrook, both of Ill.

[73] Assignee: Kraft, Inc., Glenview, Ill.

[21] Appl. No.: 357,057

[22] Filed: May 25, 1989

[51] Int. Cl.⁴ .................................................. A23C 19/06
[52] U.S. Cl. ........................................ 426/582; 99/454; 426/506; 426/511; 426/519; 426/521
[58] Field of Search .............. 426/582, 506, 510, 511, 426/519, 521; 99/348, 452, 454

[56] References Cited

U.S. PATENT DOCUMENTS 4,091,721  5/1978  Cosmi ................................. 426/506
4,110,484  8/1978  Rule et al. ........................... 426/582

*Primary Examiner*—George Yeung
*Attorney, Agent, or Firm*—Fitch, Even, Tabin & Flannery

[57] ABSTRACT

The present invention is directed to a method for making Pasta Filata cheese which has an extended shelf life. Pasta Filata curd is divided into pieces and the pieces are delivered to an auger conveyor. The curd is heated and worked in the auger conveyor while immersed in hot water to a plastic consistency as it passes through the conveyor. The plastic curd is transported through a steam injection heating zone and a static mixing zone to provide a homogeneous molten curd. The molten curd is transferred from the mixer through a holding conduit into a vacuum chamber so as to flash-cool the molten curd. The holding conduit has a diameter and length sufficient to hold the molten curd for a time and at a temperature which is sufficient to pasteurize and partially sterilize the molten curd. The holding conduit has a particular inner wall surface which is formed of a material with enhanced lubricity and reduced coefficient of friction as compared to stainless steel.

11 Claims, 1 Drawing Sheet

METHOD FOR MANUFACTURING OF PASTA FILATA CHEESE WITH EXTENDED SHELF LIFE

FIELD OF THE INVENTION

The present invention is directed to a method for making Pasta Filata cheese with an extended shelf life. More particularly, the present invention is directed to a continuous process for treating Pasta Filata cheese curd that is heated and worked to a plastic consistency. The plastic curd is transported through a steam injection heating zone and a static mixing zone to provide a homogeneous molten curd. The molten curd is transferred from the mixer through a holding conduit into a vacuum chamber. The holding conduit has particular properties to provide the benefits of the invention.

BACKGROUND OF THE INVENTION

The principal varieties of Pasta Filata cheese are mozzarella, scamorze and provolone. Pasta Filata cheeses, sometimes referred to as Italian cheese, are characterized as being prepared by a process that includes the step of immersing the curd in hot water or hot whey and working, stretching and molding the curd while it is in a plastic condition. A conventional method for the manufacture of Pasta Filata cheese, such as mozzarella, is described in Kosikowski, F., Cheese and Fermented Milkfoods, 1966, Edwards Brothers, Inc., Ann Arbor, Mich. (pp. 162-167). In the method described by Kosikowski, standardized milk is pasteurized and cooled to a temperature of about 90° F. A starter culture is added with sufficient rennet to coagulate the milk in about thirty minutes. The resulting coagulant is cut to provide pieces of curd in whey. The cut curds are set in the warm whey for about fifteen minutes with periodic gentle agitation. The curds in the whey are pushed to the back of the vat and the free whey is removed from the vat. Whey removal is slower than that for cheddar cheese because of a lack of cooking and acidity. As the whey departs, the curds are packed gently together. The large curd packs are cut into blocks to effect quicker cooling. The curd blocks are rinsed with cold water and immersed in cold water. The cold water is drained after fifteen minutes and the curds are bundled into clean cheese cloth to make 45- to 60-lb. bundles. The curd bundles are placed in a chill room (40° F.) to effect further draining of curd. The whey drains from the curd bundles overnight in the chill room. The curd, at this point, is referred to as raw curd. The drained curd bundles are removed from the chill room and acid ripening is commenced by exposing the drained curd bundles to warmer room temperatures for a period of at least one day. The curd bundles are removed from the warm room after complete drainage and after the cur pH decreases to a level of 5.2 to 5.4.

The cloth is removed from the acidified raw curd and the curd bundle is chopped into small pieces. These pieces are placed in hot water or hot whey, about 180° F. in a mechanical blender. The hot water covers all the curd by a few inches. The curds are left in the hot water for a few minutes but not long enough for them to exceed a temperature of 135° F. A gentle molding agitation is then started with a mechanical apparatus which is used to pull and stretch the raw curd into a smooth, white plastic mass. The hot plastic mass is packed into suitable molds. Later, the cheeses are immersed in a salt brine for a period of about twenty-four hours. The cheese is then dried in air and is wrapped and packaged for shipment.

It is apparent from the above description that considerable handworking of the cheese curd is required. It is also apparent that the process is complicated and subject to control problems. Numerous attempts have been made to provide improved methods for the manufacture of Pasta Filata cheese wherein the working and stretching of the raw curd is subplanted by continuous mechanical methods. U.S. Pat. No. 3,692,540 to Mauk describes a method for the manufacture of Pasta Filata cheese wherein the curd is held in whey to acid condition the curd. The curd is held until the acidity of the whey is from 0.25 to 0.30%. The raw curd is divided into pieces and the curd pieces are heated without working in a process cheese cooker to a temperature of 130°-160° F. The method of the Mauk patent utilizes a final direct heating step without working or stretching the cheese curd.

U.S. Pat. No. 3,117,008 to Mauk teaches a method for the manufacture of Pasta Filata-type cheeses wherein final curd texture is achieved by curing the curd for a period of time sufficient to provide a cheese having a smooth and continuous texture. In the method, a Pasta Filata curd, which includes acid-producing agents, is cooked at a temperature below that at which the acid-producing agents are substantially inactivated. Thereafter, the curd is leached to remove acid and provide an acidity of less than about 0.8%. The curd is then pressed and the pressed curd is subjected to vacuum conditions to close the curd. Thereafter, the curd is cured and the curing process provides a cheese having a smooth and continuous texture through the development of acidity by the acid-producing agents.

U.S. Pat. No. 3,531,297 to Kielsmeier, et al. is directed to a process for making Pasta Filata cheese wherein Pasta Filata cheese curd is subjected to particular treatment to make it more suitable for the steps of the Pasta Filata cheese-making process which follow cheddaring. The Pasta Filata cheese steps which follow cheddaring include heating the curd particles by contact with heated water to a temperature in the plastic temperature range of the curd while mixing and stretching the curd. The Kielsmeier, et al patent teaches that the mixing and stretching may be continued under superatmospheric pressure while forcing the curd through a restricted backpressure-creating outlet.

While the methods of the above-described patents are an improvement over the conventional method for the manufacture of Pasta Filata cheese, it would be desirable to provide a method for making Pasta Filata-type cheeses wherein an extended shelf life can be established.

Accordingly, it is an object of the present invention to provide an improved method for making Pasta Filata cheese. It is another object of the present invention to provide a method for making Pasta Filata cheese that extends the shelf life of the cheese. It is a further object of the invention to provide a method for making Pasta Filata cheese that is simple and economical and which lessens the amount of handworking of the curd.

SUMMARY

Generally, the present invention is directed to a method for making Pasta Filata cheese from a Pasta Filata curd produced by any of the conventionally known methods. The curd is divided into pieces and the pieces are delivered to an auger conveyor. The curd is heated and worked in the auger conveyor to a plastic consistency as it passes through the conveyor. The plastic curd is transported through a steam injection heating zone and a static mixing zone to provide a homogeneous molten curd. The molten curd is transferred from the mixer through a holding conduit into a vacuum chamber so as to flash-cool the molten curd. The holding conduit has a diameter and length sufficient to hold the molten curd for a time and at a temperature which is sufficient to pasteurize and partially sterilize the molten curd. The holding conduit has a particular inner wall surface which is formed of a material with enhanced lubricity and reduced coefficient of friction as compared to stainless steel.

DESCRIPTION OF THE DRAWING

The single FIGURE is a schematic flow diagram depicting apparatus useful in the practice of the present invention.

DETAILED DESCRIPTION OF THE INVENTION

Figure 1:
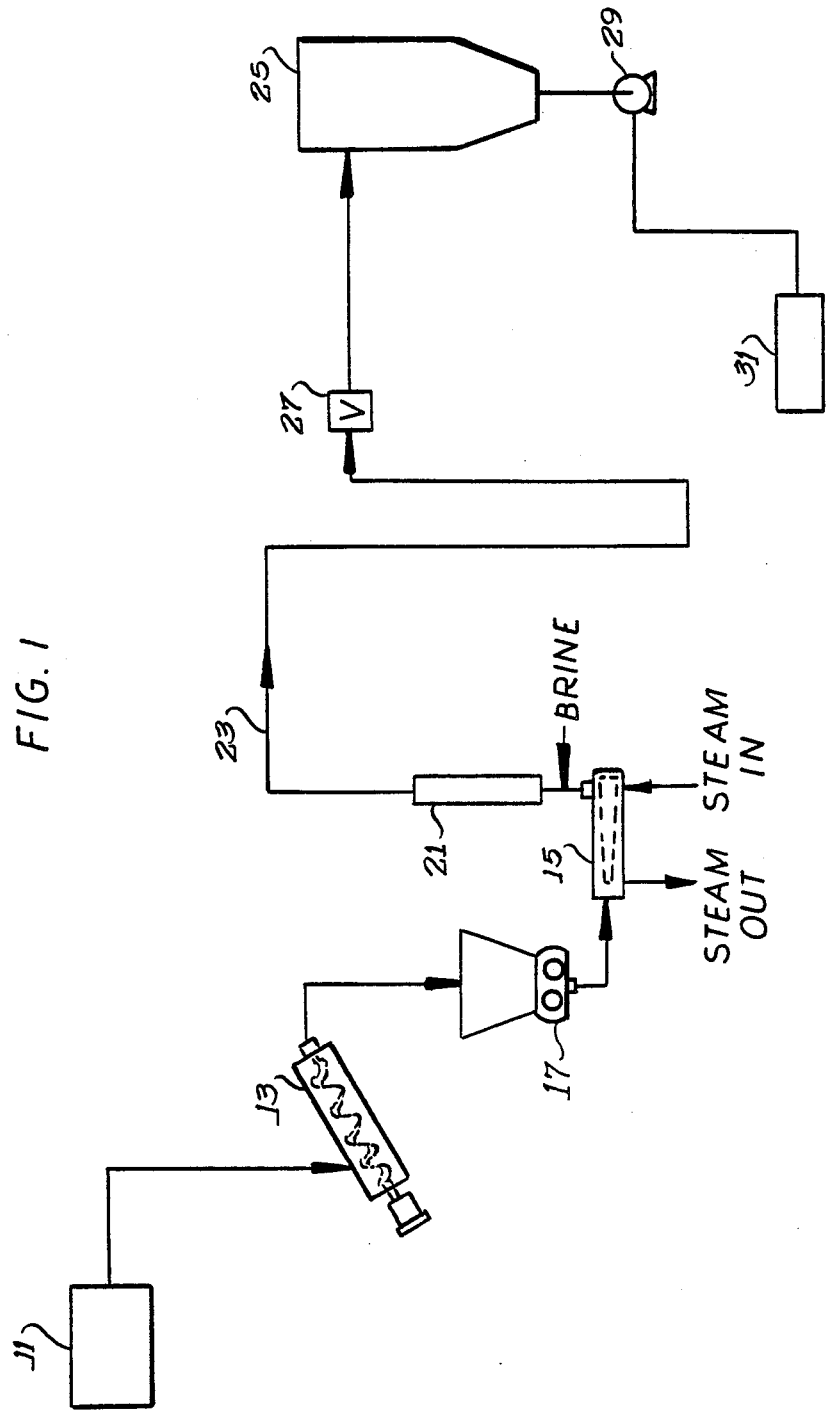

In general, in a process embodying various features of the invention, Pasta Filata curd is first prepared in accordance with conventional procedures for making Pasta Filata cheese. A fluid media is provided containing non-fat milk solids and fat. Acidity is developed in the media and the media is set with rennet to provide a coagulum, which is cut to provide curd and whey. The whey is drained from the curd and the drained curd is held until the curd develops a particular level of acidity. The curd is washed with water and may be salted. The curd is then drained and may be pressed to remove additional whey from the curd and provide curd blocks. The drained curd may be used immediately or curd blocks may be stored and cured for longer periods of time.

As indicated, the fluid media which is used to prepare Pasta Filata cheeses contains non-fat milk solids and fat. The non-fat milk solids may be provided from whole milk, reconstituted dried non-fat milk solids or skim milk. The fat may be milk fat or other suitable fat. The fat may be provided from whole milk, partially skimmed milk, or a suitable fat may be added. Depending upon the type of Pasta Filata cheese to be made, fat is present at a level from about 1% to about 4% by weight of the fluid media and non-fat milk solids are present at a level of from about 8% to about 11%.

Acidity is developed in the fluid media by the addition of a lactic acid-producing culture, such as *Streptococcus lactis* or a *Lactobacilli*, and ripening the media. Ripening of the media to develop acidity is continued until the pH of the fluid media is at a level of from about 5.5 to about 5.0. The fluid media is usually ripened in from about 30 minutes to about 1 hour when the ripening is performed at a temperature of 100° F. Rennet may be added at the same time as the starter culture or may be added after ripening has finished. The fluid media is set with rennet to provide a coagulum. The rennet is added at a level usually used in the production of Pasta Filata-type cheese.

As used herein, acidity will sometimes be expressed by percent acidity (which refers to equivalent lactic acid unless otherwise indicated) and sometimes by pH. In this connection, the acidity of the fluid media may be easily determined by titration or direct pH measurement and expressed as either percent acidity or pH. After a coagulum has been formed and divided to provide curd and whey, the acidity of the curd and whey may be different at any particular time and reference to acidity must be identified as being that of the curd or the whey. Acidity of the curd is determined by the gold electrode and quinhydrone method as set forth in U.S. Pat. No. 3,692,540 to Mauk.

A firm coagulum is usually obtained about 30 minutes after the rennet is added. The coagulum is thereafter cut to provide curd and whey. The acidity of the whey after cutting is usually from about 0.10% to about 0.13% and the pH of the curd is from about 6.3 to about 6.5. After cutting, the coagulum may be stirred and heated for a brief period of time to initiate whey expulsion from the curd.

The curd and whey are then transferred to a drain table or drain belt and whey is drained from the curd to provide moist curd with some retained whey. The drained curd is held until the acidity of the curd reaches a pH of from about 5.0 to about 5.5. The pH of the whey retained by the curd at this time is from about 5.6 to about 5.7 and the percent acidity of the retained whey is from about 0.25 to about 0.30. The curd can then be washed with water having a temperature of from about 35° F. to about 90° F., preferably from about 35° F. to about 40° F. The wash water is preferably used at a level of from about 15% to 30% of the whey that was drained.

The curd is retained in the wash water until the curd temperature is reduced to about 75° F. The wash water is then drained. Cooling of the curd shrinks the curd and expels whey and free lactose. The curd acidity after the wash step is such that the pH of the curd during the subsequent heating and working step is from about 5.0 to about 5.5, preferably about 5.1 to about 5.3.

The curd may be salted by direct addition of salt to the curd. The salt may be added as dry salt to the drained curd or may be injected as a salt brine into the molten cheese during subsequent processing steps. Salt is added at a level sufficient to provide about 1.7% to about 2.6% salt in the final cheese product. Usually about 2.5 lbs. of salt per 1,000 lbs. of milk is sufficient.

The curd is then transferred to cheese hoops or drums and is covered and pressed for about one hour or longer. The curd may be stored overnight or may be cured for longer periods of up to about ten days, prior to use in the remaining steps of the process.

In a preferred embodiment of the present invention, whey is drained from the curd by means of a drain belt. After the coagulum is cut to provide curd and whey and the required acidity has been developed, the curd and whey are transferred to a drain belt. Whey is drained from the curd as the curd is being transferred by the drain belt to a curd mill. The curd knits together to form an even mat as it is being transferred on the belt. In this embodiment, the curd is not washed and salt is preferably added by brine injection into the molten cheese during a subsequent step in the method of the invention.

The curd is removed from the drain belt or the hoops and is broken into small pieces by means of a curd mill 11. The curd pieces are then introduced into a twin auger conveyor 13 which is mounted at an angle and is partially filled with hot water or hot whey. The twin augers are non-intermeshing and convey the curd pieces along the length of the conveyor while the curd is immersed in hot water. The hot water is preferably maintained at a temperature of from about 150° F. to about 180° F. During passage through the conveyor, the curd pieces are heated to a temperature of from about 130° F.

to about 155° F., while being worked and stretched by the twin augers. The curd exits from the conveyor 13 in a plastic condition. There is no pressure on the curd at this point in the process.

The curd is then subjected to heating by steam injection in steam injector 15. Steam injector 15 is substantially similar to that described in U.S. Pat. No. 4,112,131 to Bosy, et al., the teachings of which are incorporated herein by reference. The curd must be introduced into the steam injector 15 under pressure. A positive displacement pump 17 is used to provide pressure on the curd. The positive displacement pump 17 moves the curd through the steam injector at a pressure of from about 10 to about 150 psig.

The curd is subjected to heating in steam injector 15 to a temperature in the range of from about 80° F. to about 250° F. At these temperatures, the curd is transformed into a molten cheese mass. A salt (NaCl) brine may be injected into the molten cheese as it exits from the steam injector. To effect suitable mixing of the molten cheese mass, the salt brine and the steam, the cheese mass is then transferred through a static mixer 1, such as is described in U.S. Pat. No. 4,112,131 to Bosy, et al.

The molten cheese mass is then transferred from the mixer through a holding conduit 23 to a vacuum chamber 25. A backpressure valve 27 is used to maintain the pressure of the molten cheese curd at a level of at least about 1 to about 50 psig prior to the introduction of the molten cheese mass into vacuum chamber 25. Vacuum chamber 25 is maintained at a vacuum of from about 2.5 to about 5.5 psia. As the molten cheese mass is introduced into vacuum chamber 25, moisture is evaporated from the molten cheese curd at a level approximately equivalent to the moisture introduced into the curd during the steam injection step in steam injector 15 and the cheese mass is cooled to a temperature in the range of from about 135° F. to about 165° F.

A positive displacement pump 29 is used to transfer the cheese from vacuum chamber 25 to molding apparatus 31. The molded cheese can then be salted in a brine pool, if salt has not been previously added to the cheese curd.

Looking now particularly at the holding conduit 23, there are several particular features of the holding conduit. The holding conduit has a diameter and length between the static mixer 21 and introduction into vacuum chamber 25 in relation to the flow rate of the molten cheese mass which is sufficient to hold the molten cheese curd for a time at the temperature of the molten cheese mass which is sufficient to pasteurize and to partially sterilize the resultant cheese. Such time and temperature conditions are substantially higher than have previously been used with respect to treatment of Pasta Filata cheese curd. Such time and temperature treatment conditions are sufficient to provide a substantially extended shelf life for Pasta Filata cheese prepared in accordance with the invention. In general, the holding conduit is sized to produce a residence time of from about 20 to about 120 seconds. To provide the required residence time, the holding conduit 23 preferably has an inside diameter of from about 1 to about 3 inches and a length of from about 10 to about 100 feet for molten curd mass flow rates of from about 75 to about 200 pounds per minute.

A further feature of the holding conduit 23 is that the inner wall surface of the conduit which extends between steam injector 15 and vacuum chamber 25 and the static mixer 21 are formed of a material with a reduced coefficient of friction, reduced adhesion, and enhanced lubricity as compared to stainless steel. The preferred wall surface material for holding conduit 23 is any of the commercially available fluoroplastics, such as polytetrafluoroethylene (PTFE), fluorinated ethylene propylene (FEP), ethylene tetrafluoroethylene (ETFE), polyvynliadene fluoride (PVDF), perfluoroalkoxy (PFA), and ethylene-chlorotrifluoroethylene (ECTFE). In some cases, the fluoroplastic will be used to line a stainless steel or other solid wall conduit and in other cases, the conduit will be prepared wholly from the fluoroplastic. Such provision of an inner wall surface having reduced coefficient of friction, reduced adhesion, and enhanced lubricity, compared to stainless steel is necessary to prevent burn-on of the molten Pasta Filata cheese curd as it exits from the steam injector 15.

The following example further illustrates various features of the invention but is in no way intended to limit the scope of the invention which is defined in the appended claims.

EXAMPLE I 2200 pounds of skim milk that has been pasteurized and has a milk fat content of 2% is transferred to a vat. A starter culture of *S. lactis* is added and after 30 minutes of ripening time the pH is 6.5 and the total acidity is 0.18 percent. Single strength calf rennet (55 ml/1000 pounds of milk) is added and the vat is allowed to set for 30 minutes. The coagulum is then cut into $\frac{1}{2}$ inch cubes. The curd is slowly stirred for 10 minutes before cooking. Heat is slowly added to the vat to increase the temperature to 106° F. to expel whey and excess moisture. After cooking the curds for 30 minutes, the pH has dropped to 6.25. The curds and whey are then pumped from the vat to a drain belt. On the drain belt the curds knit together to form an even mat and moisture and whey are drained as it travels. The length of time that the curd is left on the belt is dependent on the activity of the microorganism. The pH of the curd should be 5.2 before reaching the curd mill. The curd is milled and the milled cheese curd is introduced into a twin auger conveyor which is mounted at an angle of 45° F. and which is filled with hot water at about 175° F. The cheese curd which is 45° F. at the time of introduction to the auger has a solids content of 49.9, a milk fat of 18.90, pH 5.2 and salt 0.8%. The cheese curd pieces are heated to a temperature of 140° F. while being worked and stretched by the twin augers. The curd exits the auger into a holding tank and is pumped at 30 psig pressure by a positive displacement pump to a direct steam injection nozzle. The molten curd is heated to a temperature of 200° F. before a saturated salt brine solution is injected in-line. To effect suitable mixing, the molten cheese mass, salt brine and steam are transferred through a series of static mixers. The molten mass is then transferred at a rate of 100 pounds per minute at a 6 psig pressure through a holding conduit into a vacuum chamber. The holding conduit has an inside diameter of 1½ inches and a length of 20 feet into a vacuum chamber. The residence time of the molten cheese in the holding conduit is 40 seconds. The vacuum chamber at 4 psia cools the product down to 140° F.

A positive displacement pump then transfers the cheese from the vacuum chamber to the desired molding and packaging machine. This product which does not require additional exposure to a salt brine pool is filled hot (140° F.) and is then cooled to 45° F. The resulting finished product has a total bacterial count of <10 per gram, a 51.4% moisture, 17% fat, 1.7% salt and a pH of 5.20.

What is claimed is:

1. A method for making Pasta Filata cheese comprising providing a Pasta Filata curd, dividing said curd into pieces, delivering said curd pieces to an auger conveyor, heating and working said curd to a plastic consistency as it passes through said conveyor, transporting said plastic curd through a steam injection heating zone and a static mixing zone to provide a homogeneous molten curd, transferring said molten curd from said mixer through a holding conduit into a vacuum chamber so as to flash cool said molten curd, said holding conduit having a diameter and length sufficient to hold said molten curd for a time at the temperature of said molten curd which is sufficient to pasteurize said curd and said conduit having an inner wall surface formed of a material with enhanced lubricity as compared to stainless steel.

2. A method in accordance with claim 1 wherein said curd is immersed in heated water while said curd is worked in said auger conveyor.

3. A method in accordance with claim 1 wherein said curd is heated to a temperature of from about 130° F. to about 150° F. while being worked in said auger conveyor 4. A method in accordance with claim 1 wherein said plastic curd is heated to a temperature of from about 180° F. to about 250° F. in said steam injection heating zone.

5. A method in accordance with claim 1 wherein the residence time of said molten curd in said holding conduit is from about 20 to about 120 seconds.

6. A method in accordance with claim 1 wherein said holding conduit has an inside diameter of from about 1.0 to about 3.0 inches and a length of from about 10 to about 100 feet.

7. A method in accordance with claim 6 wherein the flow rate of said molten curd through said holding conduit is from about 75 to about 200 pounds per hour.

8. A method in accordance with claim 1 wherein the inside wall of said holding conduit is formed from a fluoroplastic.

9. A method in accordance with claim 8 wherein said fluoroplastic is selected from the group consisting of polytetrafluoroethylene (PTFE), fluorinated ethylene propylene (FEP), ethylene tetrafluoroethylene (ETFE), polyvyniladene fluoride (PVDF), perfluoroalkoxy (PFA), and ethylene-chlorotrifluoroethylene (ECTFE).

10. A method in accordance with claim 1 wherein said vacuum chamber is maintained at a vacuum of from about 2.5 to about 5.5 psia.

11. A method in accordance with claim 1 wherein said molten curd is cooled to a temperature of from about 135° F. to about 165° F. in said vacuum chamber.

* * * * *